United States Patent [19]

Hart

[11] Patent Number: 4,555,409
[45] Date of Patent: Nov. 26, 1985

[54] CEREAL PROCESSING

[76] Inventor: Edwin R. Hart, Box 5184, Richardson, Tex. 75080

[21] Appl. No.: 598,079

[22] Filed: Apr. 9, 1984

[51] Int. Cl.⁴ .......................... A21D 6/00; A23L 1/10
[52] U.S. Cl. ................................... 426/242; 426/462; 426/464; 426/626
[58] Field of Search ............... 426/242, 507, 482, 462, 426/464, 622, 626; 99/358

[56] References Cited

U.S. PATENT DOCUMENTS

| | | | |
|---|---|---|---|
| 3,194,664 | 7/1965 | Eytinge | 426/626 |
| 3,701,670 | 10/1972 | Pierce | 99/358 |
| 4,126,707 | 11/1978 | Hart | 426/482 |
| 4,234,614 | 11/1980 | Hart | 426/482 |

Primary Examiner—George Yeung
Attorney, Agent, or Firm—Wendell Coffee

[57] ABSTRACT

Cereal grains having a moisture content of about 30% by weight are made into masa by radiating with infrared radiation until partially gelatinized. Thereafter, they are ground to a meal. If it is desired to dehusk the grains, this is done by agitating an aqueous slurry as by repeated pumping and surface drying and aspirating the husk before radiation. After radiation, any remaining husks are separated by cracking the radiated grain, sizing the cracked grain, and separating the husks from each size. Some grains may be dehusked by only the cracking, sizing, and separation steps. A variation of masa is made from a mixture of corn with husks and milo without husks.

4 Claims, 3 Drawing Figures

CEREAL PROCESSING

BACKGROUND OF THE INVENTION

(1) Field of the Invention

This invention relates to cereal preparation and more particularly to preparing a product commonly called masa.

(2) Description of the Prior Art

Masa is a term used to refer to a cereal product in the United States. In Mexico it is commonly a corn product also known as mensa.

On a commercial basis, the cereal which is used for making masa at the present time is corn. However, the process according to this application also has application for milo, wheat, oats, barley, triticale, rye, and rice.

Traditionally and before this invention, the product was made by a process which included cooking for a period of approximately 18 minutes and steeping for 8 to 10 hours, kernel corn in a lime (calcium hydroxide) solution. Thereafter, the husk of each kernel was, having been loosened by the steeping, removed, the kernel ground into a meal and used; or was dried for flour. Obviously, the steeping period removed a large amount of vitamins, starches, oils and other nutrients contained in the corn. The losses are often from 20% to 40% by weight.

My prior U.S. Pat. Nos. 4,234,614, issued on Nov. 18, 1980, and 4,126,707, issued on Nov. 21, 1978, describe a method for processing cereal grains which is summarized as including the steps of mixing cleaned kernels with water to form a thick slurry, pumping the slurry through a plurality of stages of pumps equipped with throttle valves to remove the husk from the kernels, dewatering the slurry to remove excess waters, surface drying and aspirating to separate the husks from the kernels. The grains may then be milled, preferably by an impact grinder.

The prior patents also disclose a method of removing any remaining husk and the germ which includes cracking the grain in a fan, then feeding the sized grits and husks from the cracked grain to aspirators that separated the grits and husks. The germ may be removed by gravity separators.

Also, before this invention, Chardo W. Pierce obtained U.S. Pat. Nos. 3,694,220; 3,701,670; and 4,153,733. These patents disclose processing of grains by infrared radiation of the grains to partially gelatinize the grain to a soft, turgid state almost to the point of eversion. After radiation, the grains are immediately rolled to flake out them.

SUMMARY OF THE INVENTION

(1) New Functions and Surprising Results

I have invented an improved method of producing masa and other precooked cereal grain.

One means of preparing masa according to my improved method is to prepare kernels of corn by cleaning, then the corn is tempered by bringing it up to the proper percentage of water by weight that will provide a correct amount of moisture for uniform gelatinization, and adding calcium hydroxide for taste only of the finished product.

The correct amount of moisture has more to do with uniform gelatinization than just with obtaining a product that is soft and turgid when it is almost to the point of eversion. Specifically, the inner endosperm will tend to gelatinize before the endosperm. Therefore, it is desirable that the endosperm have the proper degree of moisture so that upon a very short period of intense radiation by infrared radiation, that the product will have uniform gelatinization for further processing so that a uniform end product may be obtained. The moisture will vary depending upon the grain. I have found that this amount of moisture is about 30% by weight. Then the kernels of corn are infrared radiated by placing them upon a traveling continuous belt which passes under the infrared radiators. After the corn has been cooked to a correct degree of gelatinization, it is rolled as disclosed in the Pierce patents. Thereafter the grain is milled by an impact grinder such as a hammer mill or a pin mill. The ground or milled product is sifted to pass through a 60-mesh screen as the final masa.

In the above process, the husk of the corn is left with the corn which is not objectionable unless the masa is to be used in a fried product such as in making corn chips or taco shells. In the event that the husks are considered to be undesirable, the husk is removed by cracking the corn immediately after rolling, and then sizing and separating the husk from the grain with aspirators.

As a variation of my invention, I have found that masa may be prepared from corn and grain sorghum or milo.

The terms "milo" and "grain sorghum" are used interchangeably in this application. The term "corn" refers to Indian corn or maize (Zea mays). The term "meal" or "flour" is used to mean a coarse flour which will pass through a 60-mesh sieve.

To prepare the product with milo, the milo grain is first dehusked by the wet process described in my prior patent including surface drying and the separation of the husk from the grain. Thereafter, the grain, still having a high water content, is radiated by an infrared source as described above. The grain is then rolled as described in the Pierce process. Then the milo kernels are cracked by a fan, and processed as described in my prior patent to remove the remaining husk and thereafter, milled. The processed corn and milo is then blended and ground to form the meal.

The product is made of about one-half corn, and one-half grain sorghum. Preferably, this mixing is done by running the two grains into the impact grinder simultaneously so that the two grains run through the impact grinder together and are thereafter sifted to the preferred fineness.

Taste test have indicated the mixed masa prepared as described above is equally acceptable as the masa prepared by the traditional method. However, not having the extended steeping and cooking time, the product according to this invention has a higher vitamin and fat content. Also, a certain amount of other material is lost in the traditional processing which is not lost in this process, resulting in a higher yield.

Thus, it may be seen that the function of the combination of all the parts of this invention far exceeds the total of the functions of the individual elements such as pumps, heaters, rollers, mills, etc.

(2) Objects of this Invention

An object of this invention is to prepare masa and other precooked cereals.

Other objects are to achieve the above with a method that is versatile, ecologically compatible, energy conserving, rapid, efficient, and inexpensive, and does not require skilled people to install, adjust, operate, and maintain.

Still further objects are to produce a product rapidly, efficiently, with minimum energy, and inexpensively, that is palletible, nutritious, has good storage life, and is easily digested.

The specific nature of the invention, as well as other objects, uses, and advantages thereof, will clearly appear from the following description and from the accompanying drawing, the different views of which are not scale drawings.

DESCRIPTION OF THE PREFERRED EMBODIMENTS

Example 1

Figure 1:
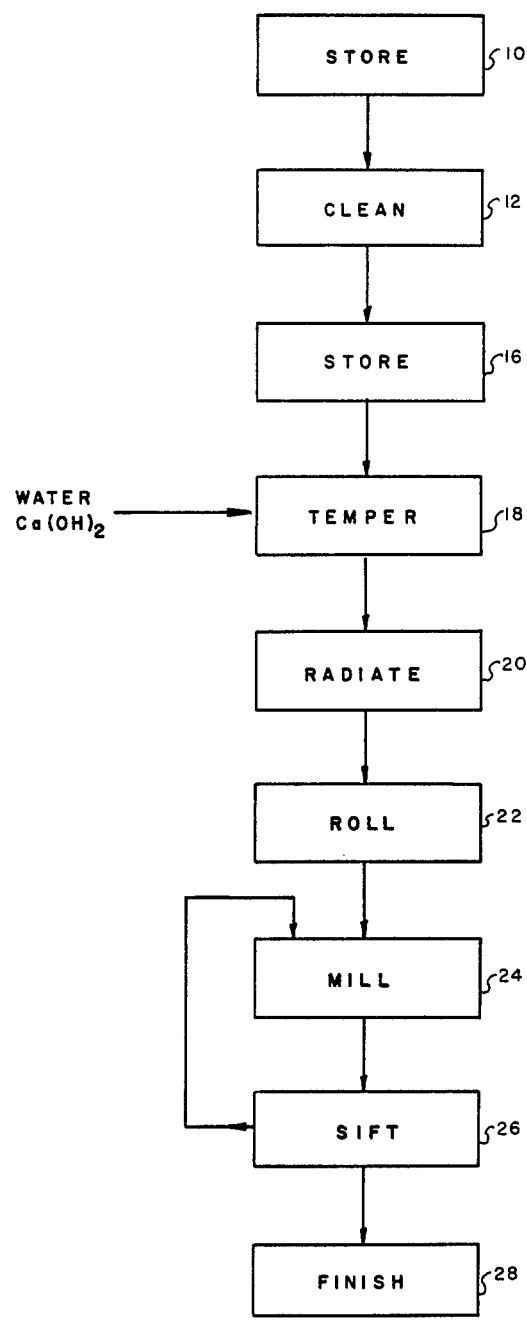
FIG. 1 is a flow diagram schematically representing an embodiment of this invention.

FIG. 1 illustrates all of the steps taken in this example 1. In addition, FIG. 1 illustrates some steps that are not taken in example 1, but are taken in example 2.

To prepare corn according to my invention, the corn is normally received in storage 10. From there, it is cleaned in step 12. From there, it is again stored in step 16. Thereafter, it is tempered at step 18 by adding water to bring it up to 30% moisture by weight. Different qualities of corn will require slightly different moisture contents. Also, about 1% of calcium hydroxide [Ca(OH)2] by weight of corn is added for taste. The amount of calcium hydroxide is not critical and may be changed according to the desired taste of the finished product.

Thereafter, the tempered kernels of corn are fed to an infrared cooker. This will be basically according to that shown in the Pierce patents, except that there will be a traveling metallic continuous belt which travels beneath the micronizing radiators. There, the corn will be cooked or heated by the radiation until it reaches the right degree of gelatinization. This infrared radiation is step 20. From there, the grain is ground as in step 24. The grain may be ground by hammer mill or by a Sturdevant pin mill or other similar device. The ground grain or flour is then sifted at step 26. From the sifter, all product passing a 60-mesh screen, is used as the finished masa. That not passing the screen is put back into the intake of the mill where it is again ground. The finished masa is used as other masa.

Example 2

The same steps are carried out for this example as were performed in example 1. There is the additional step that after the infrared heating, the grain is flaked by dropping from the traveling continuous belt into corrugated rollers as disclosed by Pierce for the rolling step 22. The rolled flakes are then ground as step 24 in example 1.

Example 3

Figure 2:
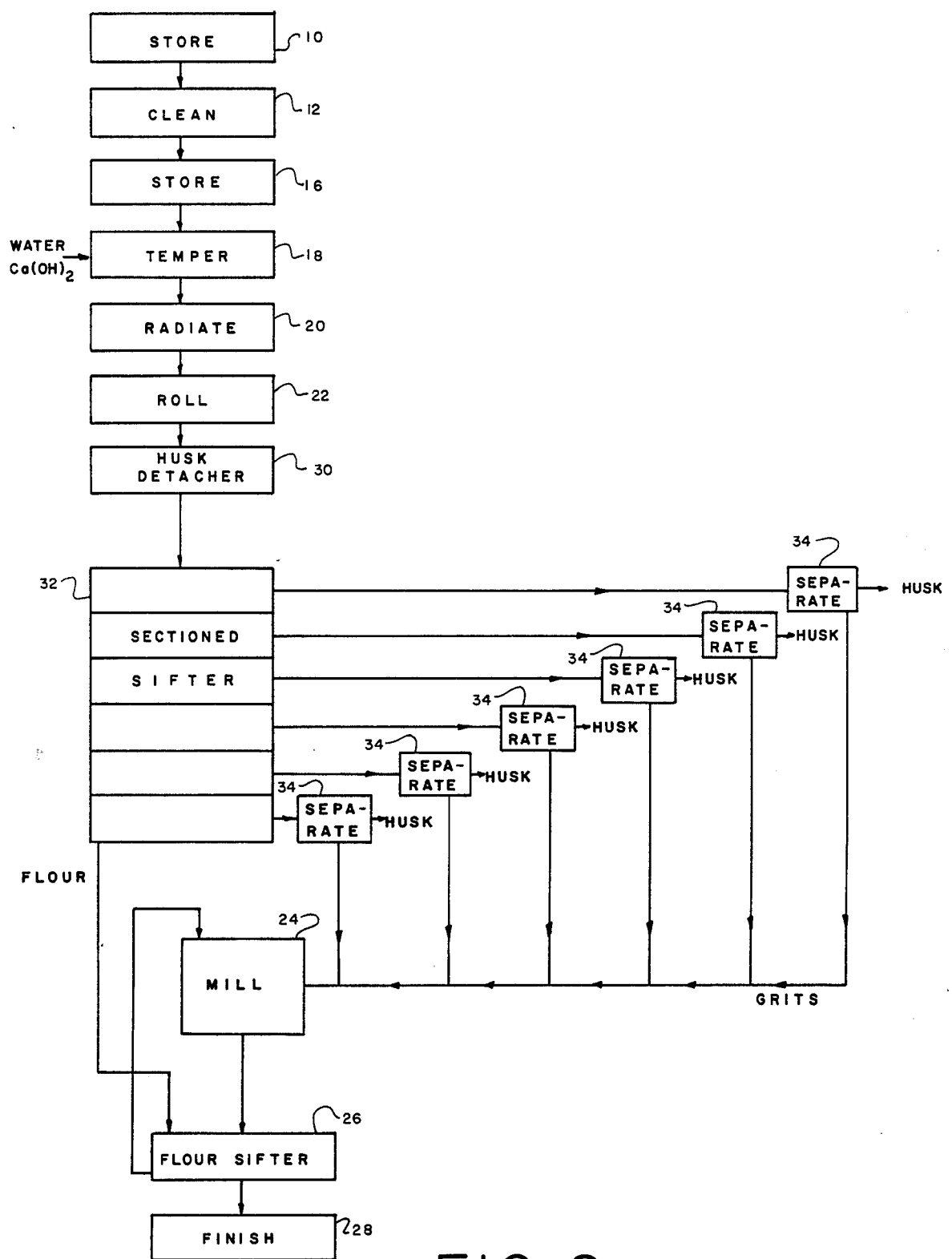
FIG. 2 is a flow diagram schematically representing another embodiment of this invention.

The steps of example 3 are shown in FIG. 2. FIG. 2 also shows steps which are not carried out in example 3.

In this example, the same steps of storage, cleaning, again storing, tempering, and radiating with infrared radiation are carried out upon corn as in example 1.

After radiation, the corn is fed to a centrifugal impact husk detacher 30 as described in my prior patent '614 as a germ detacher. From the husk detacher, the product is then fed to sectioned sifter 32, described in my previous patent, to size the product. The operation of the sifter to size the product is that the flakes after radiation at 20 are fed to the husk detacher 30. All of the product from the husk detacher is fed into sectioned sifter 32 having progressively smaller screens. What passes through each screen is fed to the next smaller screen. The material that does not pass through each section is fed for husk separation to an aspirator 34. Each aspirator 34 passes the grits from that aspirator to impact mill or grinder for grinding 24, as described above. The husks are disposed of as animal feed or the like. Each of the aspirators 34 is the same, except because of the different size of grits and husks, each will be adjusted to operate properly with that size. The grits from each aspirator are fed to the impact mill 34. The flour that passes the finest sifter of the sectioned sifter 32 is fed directly to the final flour sifter 26. In that sifter all that pass the screen is sent for utilization at 28 and the part that will not pass the screen is returned to the grinding step 24 as before.

Example 4

The steps of example 4 are identical to the steps of example 3, except there is the additional step of rolling at 22 after radiation and before the husk detaching step 30. This rolling step is identical to that described in example 2.

Example 5

Figure 3:
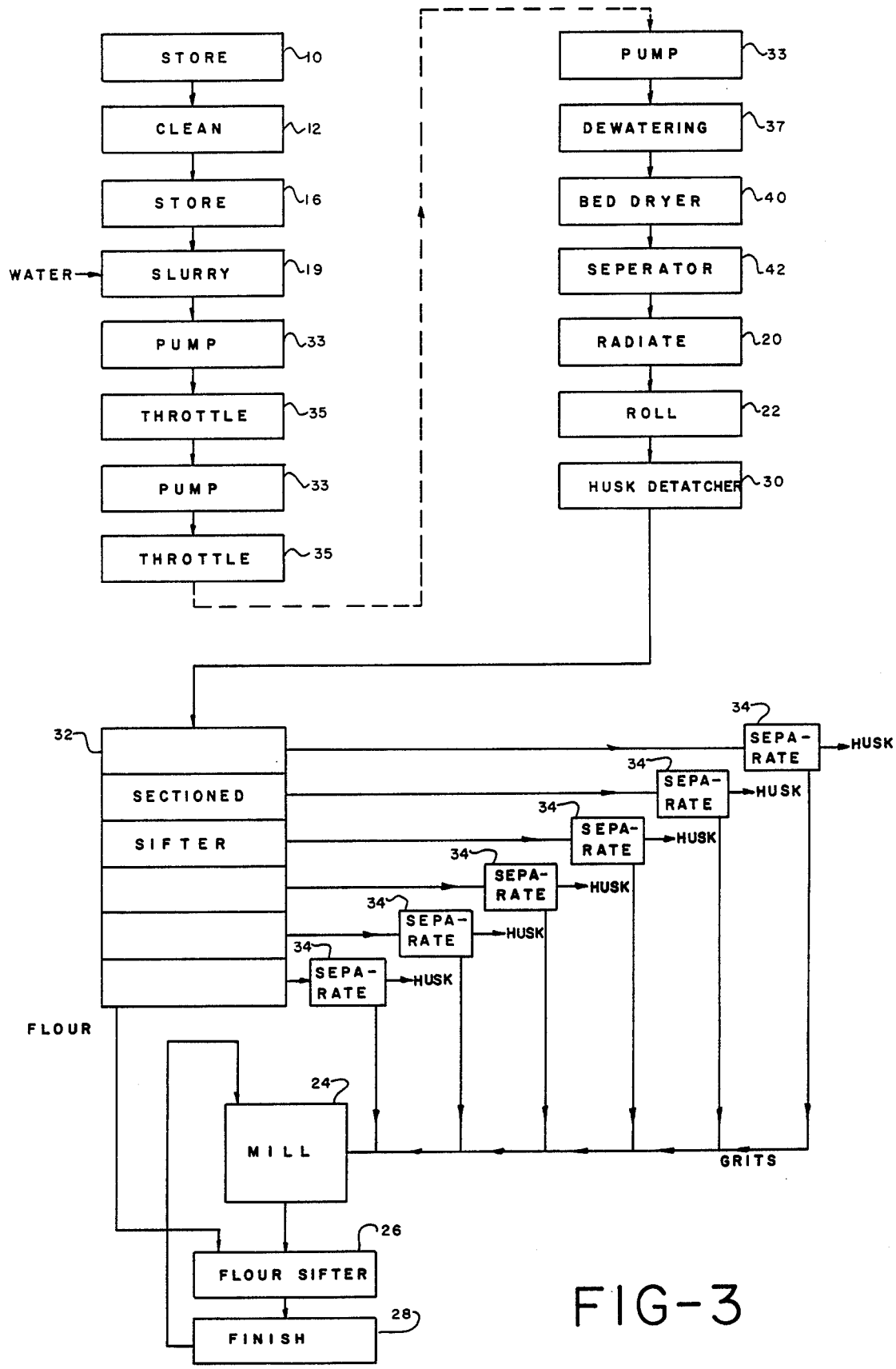
FIG. 3 is a flow diagram schematically representing still another embodiment of this invention.

The steps of this example are shown in FIG. 3.

Milo is stored at 10, then cleaned at 12, and then stored again at 16. Thereafter, water is added to the milo to make a slurry. As set forth in my prior patents identified above, about twice as much water as grain is used by weight. After the slurry is made, the slurry is pumped by pump 33 as described in my prior patent, thereafter, put through throttle valve 35 to again be pumped and again throttled, and again pumped, all as described in my prior patent. Thereafter, it is dewatered at 37 to remove the excess moisture. From the dewatering unit 37, it is fed to a fluidized bed dryer 40 to remove all surface moisture. The husk will be dried. The grain then flows to an aspirator separator 42 where the husk is removed. I prefer to use two aspirators in tandem. From the aspirator separator 42, it is fed to the infrared cooker at 20 to be radiated. The grain will be reduced to the proper moisture content by the bed dryer. After radiation to the correct degree of gelatinization it is dropped into rollers 22 to be rolled. Thereafter, the same steps as FIG. 2 beginning at 30 are followed; namely, husk detached 30, sized 32, separated 34, ground in an impact mill 23, and sifted 26 to produce the final product.

The exhaust heat from radiation step 20 is used for the bed dryer 40.

Those with the skill in the art will understand that the cereal grains besides corn or milo could be used in any of the various examples, and that various mixtures could be produced. The product produced by the mixture of corn and milo is commercial.

Specifically, wheat, rye, dehulled rice, dehulled oats, dehulled barley, or dehulled triticale, may be used in examples 1, 2, 3, and 4. Also, soybeans could be used in example 4 above. Any and all cereals grains could be used in example 5.

The embodiments shown and described above are only exemplary. I do not claim to have invented all the parts, elements or steps described. Various modifications can be made in the construction, material, arrangement, and operation, and still be within the scope of my invention.

The limits of the invention and the bounds of the patent protection are measured by and defined in the following claims. The restrictive description and drawing of the specific examples above do not point out what an infringement of this patent would be, but are to enable the reader to make and use the invention.

I claim as my invention:

1. A method of making masa from cereal grains comprising:
   a. cleaning the grains,
   b. tempering the grains by adding water until they have a moisture content of about 30% by weight,
   c. rapidly heating the tempered grains by radiating the grains with infrared radiation until the grains are uniformly partially gelatinized, then
   d. flaking the grains immediately after heating by rolling the grains through rolls while the grains are soft and turgid, and then
   e. grinding the grains to a flour.

2. The invention as defined in claim 1 further comprising:
   f. said grain being corn, and
   g. adding about 1% calcium hydroxide by weight for taste when tempering.

3. A method of making masa from milo comprising:
   a. cleaning the grains of milo, then
   b. adding sufficient water to the grains to form a slurry, then
   c. successively pumping and throttling the slurry to loosen the husk, thereafter
   d. removing excess water from the slurry, and
   e. surface drying the grains, to the extent of
   f. adjusting the moisture of the grains until they have a moisture content of about 30% by weight, then
   g. removing husk from the grains, and then
   h. rapidly heating the grains by radiating the grains with infrared radiation until the grains are uniformly partially gelatinized, then
   i. flaking the grains immediately after heating by rolling the grains through rolls while the grains are soft and turgid, and then
   j. grinding the grains to a flour.

4. A method of making masa comprising:
   a. cleaning corn grains, then
   b. tempering the corn grains by adding water until they have a moisture content of about 30% by weight then
   c. rapidly heating the tempered corn grains by radiating the corn grains with infrared radiation until the grains are uniformly partially gelatinized, and then
   d. rolling the grains through rolls while the grains are soft and turgid;
   e. cleaning milo grains, then
   f. adding sufficient water to the milo grains to form a slurry,
   g. successively pumping and throttling the slurry to loosen the husk, and
   h. removing excess water from the slurry, and then
   i. surface drying the milo grains in a fluidized bed dryer, to the extent of adjusting the moisture content of the grains until they have a moisture content of about 30% by weight, then
   j. aspirating the milo grain for husk removal,
   k. rapidly heating the milo grains by radiating the milo grains with infrared radiation until the milo grains are uniformly partially gelatinized, then
   l. rolling the milo grains through rolls while the milo grains are soft and turgid, then
   m. separating the husks from the rolled milo grains, and then
   n. mixing the corn and milo, and
   o. grinding the corn and milo into a flour.

* * * * *